United States Patent [19]

Smith et al.

[11] Patent Number: 4,501,757

[45] Date of Patent: Feb. 26, 1985

[54] YEAST AND DOUGH CONDITION COMPOSITIONS

[75] Inventors: Don L. Smith; Shirley J. Smith, both of 1683 E. 6550 S., Salt Lake City, Utah 84121

[73] Assignees: Don L. Smith; Shirley J. Smith, both of Salt Lake City, Utah

[21] Appl. No.: 575,920

[22] Filed: Feb. 1, 1984

[51] Int. Cl.³ .................. A23L 1/00; A21D 2/00
[52] U.S. Cl. .................. 426/62; 426/583; 426/653; 426/24; 426/19
[58] Field of Search .......... 426/21, 23, 24, 25, 426/26, 62, 653, 583

[56] References Cited

U.S. PATENT DOCUMENTS

| | | | |
|---|---|---|---|
| 3,407,072 | 10/1968 | Aizawa et al. | 426/62 |
| 3,531,294 | 9/1970 | Glabau | 426/62 |
| 3,803,326 | 4/1974 | Craig et al. | 426/583 |
| 3,885,051 | 5/1975 | Mussinan | 426/535 |
| 3,934,040 | 1/1976 | Smerak et al. | 426/62 |

Primary Examiner—Raymond Jones
Assistant Examiner—Elizabeth A. King
Attorney, Agent, or Firm—M. Wayne Western

[57] ABSTRACT

Yeast quickener and dough conditioner compositions having the ability to reduce raising and baking times and improving shelf life of the baked product are obtained by adding to the said compositions an activating amount of fenugreek and a rancidity inhibiting amount of rosemary. Particularly superior characteristics are obtained by adding fenugreek and rosemary to a combination of (1) whey solids, (2) lecithin, (3) ascorbic acid, along with fillers and flavoring agents such as starch, salt, dried honey and silica gel or a silicate salt.

11 Claims, No Drawings

YEAST AND DOUGH CONDITION COMPOSITIONS

BACKGROUND OF THE INVENTION

1. Field of the Invention

This invention relates to new yeast quickener and dough compositions, and more particularly, to new and improved yeast quickener and dough conditioner compositions which have the unexpected ability to reduce raising and baking times and yield improved baked products, and to a method for their preparation.

Specifically, the invention provides new and improved yeast quickener and dough conditioner compositions which when brought into contact with the yeast, accelerate or stimulate the action of the yeast to bring about a significant reduction in both raising time and baking time and yield based products having improved properties. Said new compositions are obtained by addition of an activating amount of fenugreek to the said compositions. Particularly preferred yeast quickener and dough conditioner compositions having these improved properties are obtained by the addition of an activating amount of fenugreek to a mixture of (1) whey solids, (2) lecithin, (3) ascorbic acid, and (4) rosemary.

Yeast compositions comprising dry or liquid yeast and an effect amount of the above-described improved yeast quickener and dough conditioner compositions are also provided.

2. Prior Art

Leavened baked products are generally prepared from dough containing yeast. The leavening action principally comes from the carbon dioxide produced as a result of the yeast activity. For the satisfactory production of yeast leavened baked products, it is necessary that the dough be allowed a fermentation period during which the mechanical raising of the dough mass weakens the wall that envelopes each air cell. This is known as "mellowing" of the dough and is aided by thorough hydration and by the chemical effects of acids and other by-products of yeast activity. The mellowing is needed primarily to insure the rapid increase of dough volume during the first part of the baking process without any appreciable pressure development within the loaf. If there is a high resistance to expansion at this time, many of the cell walls collapse which leads to an irregular structure with relatively large openings or holes in the crumb. While resistance to expansion is weakened during the mellowing period, it is necessary to avoid appreciable loss of gas-retaining capacity by the walls of the individual air cells.

An extended mellowing period, however, is highly undesirable from an economic standpoint. There is need in industry for a technique for decreasing the mellowing or raising period without affecting the cell wall structure as to strength and regularity, and for decreasing the baking time of the mellowed product.

In addition, it has been found that most bakery products which are leavened with yeast contain a mixture of carbohydrates in the form of starches and sugars (e.g. from flour, sugar and milk), fats which may be a solid or liquid (e.g. from lard and/or vegetable oils) and proteins (from flour and milk), and it has been difficult to obtain a homogeneous mixture from such a combination which can be uniformly acted upon by the yeast. Such non-homogeneous combinations are difficult to mix and when mixed and baked, give products which are non-uniform, easily crumbled and have poor storage capacity.

The prior art is replete with proposed additive compositions for improving various properties of bakery products. U.S. Pat. No. 1,843,051 relates to the addition of lecithin to dough to increase yields. An active powdered dry yeast containing certain specified osmotic active agents is disclosed in U.S. Pat. No. 3,407,072. A bakery additive formed from combining a mixture of lactose-consuming yeast and acid whey proteins with dry sweet whey solids is taught in U.S. Pat. No. 3,737,327. Additives containing sodium salts of acyl lactylates of long chain fatty acids or mono- or di-glycerides of long chain fatty acids are taught in U.S. Pat. No. 3,752,675. Dough compositions containing a mixture of gelatinized and ungelatinized amylaceous components, starch tenderizing agents such as mono- or di-glycerides or sodium acyl lactylates and mold and yeast inhibitors are disclosed in U.S. Pat. No. 3,767,421. A bread improver containing dried whey, ascorbic acid, dried soya protein and L-cysteine is taught in U.S. Pat. No. 3,803,326. Dough conditioners consisting of whey protein concentrates mixed with gluten activating agents containing sulfur such as cysteine, gultathione and sulfite salts and further combined with fatty acid surfactants such as mono- or di-glycerides or sodium or calcium acyl lactylates are shown in U.S. Pat. No. 3,876,805. An adjuvant for addition to yeast leavened dough mixtures consisting of an ammonium salt, an oxidizing agent and a glyceride emsulsifying agent are disclosed in U.S. Pat. No. 3,900,570. A substitute for milk solids in yeast leavened products consisting of dry whey solids, an added protein source, a calcium source, a phosphate source and a stabilizing agent form the subject matter of U.S. Pat. No. 3,943,264.

While these prior art compositions each contribute some improvement to the making of leavened bakery products, there still remains a need to promote the rapid mellowing or raising time of the dough in order to make the baking process more efficient. In addition, there is still a need to develop an efficient dough conditioning composition which will enable the rapid making of homogeneous leavened bakery products which are not easily crumbled and which have good shelf or storage life.

OBJECTS AND BRIEF SUMMARY OF THE INVENTION

It is an object of the invention to provide a composition and process for quickening the action of yeast in bakery products, thereby reducing the mellowing or raising time of the dough.

It is a further object to provide a method for reducing the raising and baking times of yeast leavened bakery products without affecting the cell structure of the baked products.

It is also an object to provide a yeast quickener and dough conditioner which interacts with the yeast, carbohydrates, fats, and proteins in the dough mixture in such a way as to bring about a homogeneous mixture which is easy to mix and handle during the preparation of the dough.

Another object is to provide a yeast quickener and dough conditioner composition which permits the production of lighter baked products which are improved as regards to crumbling and firmness and storage stability.

It has now been discovered that these and other objects can be accomplished by means of a dough conditioning composition consisting essentially of 50–75% by weight dried whey solids, 5 to 15% lecithin, 5 to 15% ascorbic acid, 0.2 to 5% fenugreek and 0.1 to 3% rosemary. These five ingredients are primary components and are considered necessary to the proper functioning of the composition. However, it is not necessary that these ingredients comprise 100% of the total composition. Secondary additives such as cornstarch, dried honey, sea salt, and silica gel may be included as part of the total dough conditioning composition. The beneficial effects of whey solids, lecithin and ascorbic acid are known and taught in the above referred to prior art. However, the combination of these ingredients with fenugreek and rosemary are not taught or suggested.

It has been found that the raising or mellowing time of yeast containing compositions are greatly decreased without affecting the cell structure of the baked products by the addition of activating amounts of fenugreek. It has also been found that the addition of the fenugreek brings about a decrease of up to 20% or more in the raising or mellowing time of the yeast containing composition and yet the walls of the air cells retain their strength and uniformity. The addition of the fenugreek also brings about an unexpected decrease in the baking time of the finished product again without materially affecting the quality of the finished baked product.

The addition of rosemary imparts added shelf life to the baked leavened products. It appears that rosemary is a natural inhibitor of rancidity of the fats and oils contained in such products.

It has been further found that the compositions of the present invention not only act as a yeast quickener but also as a dough conditioner at the same time. It has been found that by the use of such compositions a very homogeneous soft and pliable and easily worked yeast leavened dough mixture is obtained containing the afore-mentioned carbohydrates, proteins and fats, and the mixture can be baked to form products having uniform structure and firmness and improved resistance to crumbling. Moreover, there is an increased product volume and the storage quality is greatly improved. In addition, the product maintains its texture as well as the above-mentioned qualities even after freezing. Further, less yeast is required to produce a greater volume and a shorter baking time is realized.

The dough conditioner of the present invention also provides a more homogeneous batter, improved texture and finer grain when making cakes and cookies.

Thus, while the yeast is not eliminated, it is more efficiently utilized within the bounds of the present invention. The superiority of the new compositions of the present invention as noted above is illustrated in the following detailed description and examples.

DETAILED DESCRIPTION OF THE INVENTION

The new compositions of the invention are obtained by adding the specific amounts of fenugreek and rosemary to the whey solids, lecithin and ascorbic acid compositions. The fenugreek and rosemary to be added may be utilized in any available form. Such forms all contain the essential oils, resins, starches and other ingredients which impart the superior properties to the dough conditioner compositions. The fenugreek and rosemary can both be added in the form of solids or liquid mixtures alone or along with other ingredients. Powdered solids are preferable. The amount of these ingredients to be added may vary within certain limits. The amount of fenugreek added should be sufficient to effect the desired acceleration in the action of the yeast and reduction in the mellowing or raising time and decrease in the baking time of finished product. In general, amounts of fenugreek varying from about 0.2% to 5% by weight of the yeast quickening and dough conditioning composition will give decreases in raising time of up to 20%. The preferred amounts of fenugreek to be used will vary from about 0.5 to 3% by weight.

Lesser amounts of rosemary are required in order to inhibit rancidity. Amounts ranging from 0.1 to 3.0% by weight of the total composition may be used with preferred ranges varying from about 0.2 to 2.0%.

The fenugreek and rosemary may be incorporated into the yeast quickener and dough conditioner composition by any suitable means, such as spraying, mixing and the like. It is preferred to add these ingredients by stirring in small portions as the compositions are being formulated together with the other ingredients as noted hereinafter.

The fenugreek and rosemary can be added to any suitable yeast quickener or dough conditioner composition. However, it is particularly preferred that they be embodied in a composition which comprises a mixture of (1) whey solids, (2) ascorbic acid, and (3) lecithin.

The whey solids may be derived from dried whey, reduced lactose whey, reduced minerals whey or whey protein concentrate. Whey solids are comprised primarily of whey proteins, fat, lactose, minerals(ash) and water. The major difference between the various types of whey solids is in the relative amounts of each ingredient contained therein.

Whey is defined and the liquid substance obtained by separating the coagulum from milk, cream, or skim milk in cheese making. Whey obtained from a process, in which a significant amount of lactose is converted to lactic acid, or from the curd formation by direct acidification of milk, is known as acid whey. Whey obtained from cottage cheese is acid whey. Whey obtained from processes in which there is insignificant conversion of lactose to lactic acid is referred to as sweet whey. Dried whey is the dry substance obtained by the removal of water from acid or sweet whey, while leaving all other constituents in the same relative proportions as in the whey. Dried whey contains a protein content of about 10 to 15%, a fat content of about 0.2 to 2.0%, an ash content of about 7 to 14%, a lactose content of about 61 to 75% and a moisture content of about 1 to 8%.

Reduced lactose whey is obtained by removing lactose from whey by physical separation techniques. The dry product thus produced has a protein content of about 16 to 24%, a fat content of about 1 to 4%, an ash content of about 11 to 27%, a lactose content of not more than 60% and a moisture content of about 1 to 6%.

Reduced minerals whey is obtained by the removal of a portion of the minerals from the whey by physical separation techniques. Reduced minerals whey has a protein content of about 10 to 24%, a fat content of about 1 to 4%, an ash content of not more than 7%, a lactose content of not more than 85% and a moisture content of about 1 to 6%.

Whey protein concentrate is obtained by the removal of sufficient non-protein constituents from the whey such that the dried products contains not less than 25% protein. In general, whey protein concentrates are available containing from 25 up to about 75% protein, from about 1 to 10% fat, about 2 to 15% ash, not more than 60% lactose and from about 1 to 6% moisture.

Whey solids are natural emulsifiers and dough conditioners. The lactose is sometimes referred to as milk sugar and is not as sweet as sucrose or table sugar. Lactose, made up of glucose and galactose, is thought to contribute to the dough conditioning properties of the composition. Whey proteins consist primarily of lactalbumin with some lactoglobulin also being present. These proteins are superior in quality or PER (protein efficiency ratio) to cheese protein (casein) and most plant proteins. They are thought to contribute to the strength of the lamella in the rising dough and yet do not inhibit the mellowing of the dough or the volume of the final baked product. For whole wheat products a greater amount of whey proteins is preferred. Therefore, whey protein concentrates, may be the desired form of whey solids for whole wheat products.

In general, the amount of whey solids may vary from about 50% to 75% by weight of the essential ingredients in the dough conditioning and yeast quickening composition with amounts ranging from about 55 to 70% being preferable.

The ascorbic acid used in the new yeast quickener compositions of the present invention is L-ascorbic acid or Vitamin C. While ascorbic acid exists in other forms, for example, the isomer D-arabo-ascorbic acid, L-ascorbic acid is preferred because of its greater effectiveness in the composition. The amount of ascorbic acid used in the compositions may vary over a considerable range. Prefereably the amount varies from about 5% to about 15% by weight, and still more preferably, in amounts from about 8% to 13% by weight. The function of the ascorbic acid in the compositions is multifold and acts in a synergistic way with the other ingredients to give the superior products. The addition of the ascorbic acid, for example, acts to lighten the product and may assist in hydrolyzing the protein molecules into smaller peptide chains for more effective distribution throughout the structure of the baked product.

A further component of the composition is lecithin. Pure chemical lecithin consists of glycerol combined with two fatty acid radicals, phosphoric acid and choline, and has a chemical structure as indicated below:

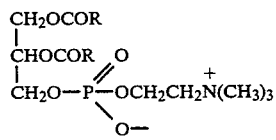

wherein R and R' are saturated or unsaturated fatty acid residues having a carbon chain length of from about 14 to 22. R and R' may be the same or different fatty acid residues.

The lecithin of commerce is predominantly soybean lecithin, although lecithin is also obtained from peanuts, rape seed, cotton seed, castor seed and eggs. Commercial lecithin is generally marketed in combination with a glyceride oil. The glyceride oil may comprise from about 20 to about 50 percent of the composition. In the practice of the present invention, commercial lecithin containing some glyceride oil may be used, or pure chemical lecithin may be used. Both the alcohol soluble and the alcohol insoluble fractions of lecithin may be used and the term "lecithin" as used herein is considered to include all of the forms of lecithin as discussed above. The amount of the lecithin to be used in the compositions may vary over a considerable range. In general, amounts of lecithin may vary from about 5% to 15% by weight of the composition, and more preferably, from about 8% to 13% by weight of the composition. The combination of the lecithin with the whey emulsifier has proven to reduce yeast requirements by about 25% while producing greater volume and yeast activity than obtained by the conventional useage of dry yeast. Moreover, the addition of lecithin allows more effective interaction between the yeast and whole grain and bleached or unbleached white flours. The lecithin further provides a coating for the dry yeast particles that help retard rehydration thus improving the storageability or shelf life of an active dry yeast-dough conditioner composition.

Photomicrographs have shown that whey solid emulsifiers interact with the flour or starch utilized in making a baked product and also with the fats or oils resulting in a thin film or fat or oil coating each starch particle. Also, through special staining and microscopy techniques, it has been shown that there is a protein complexing between the whey emulsifiers resulting in a more intimate association of proteins and fats when an emulsifier is present in the dough system.

Other additives may also be utilized but are not necessary. Corn starch may be added to the dough conditioner and yeast quickener in amounts from about 0 up to 20% by weight to add body and texture to the baked product and as a filler. For example, when the stated amounts of whey solids, lecithin, ascorbic acid, fenugreek and rosemary do not add up to 100% the difference may be made up by the addition of corn starch as a filler. The following secondary ingredients may also be utilized.

Corn oil or other vegetable oils may be used to help bind the composition together but are not necessary. Amounts of 0 up to 1.0% are usually sufficient.

Sodium chloride, especially in the form as sea salt or baker's salt, ranging from about 0 up to 6% by weight may also be utilized as a mineral additive and as a seasoning.

When making certain breads, cakes and/or cookies, it may also be desirable to have a natural sweetener in addition to the lactose contained in the whey solids used to make the dough conditioner-yeast quickener. It has been found that dried honey ranging from about 0 up to 2% by weight may be advantageously utilized.

Silica gel, aluminum, calcium and magnesium silicates and sodium and calcium aluminosilicates in finely divided form and in amounts ranging from 0 up to 2.5% may be utilized as fillers and anticaking agents.

The above-defined yeast quickener and dough conditioner compositions may be packaged separately and subsequently combined with the yeast or the yeast may be included in the composition with the other ingredients. Because of the coating and protective qualities of the lecithin, it is sometimes preferred to have the yeast included in the composition.

The amount of the quickener and dough conditioner to be combined with the yeast to obtain the desired results may vary over a considerable range. In general, the weight ratio of the dough conditioner-yeast quickener composition to the dry yeast may vary from about 1:5 to 2:1. Preferably, the yeast quickener composition and the dry yeast are utilized in about a 1:1 weight ratio.

It has been surprisingly found that the mixture of yeast and yeast quickener composition can be substituted in the various baking recipes using the same weight or volume amount of the combination as specified for the yeast alone. This obviously results in substantial yeast savings.

As noted above, the mixture of yeast and yeast quickener can be added directly to the baking ingredients or they may be added separately. The method of addition will be the same as the conventional method of adding yeast to the baking ingredients. The yeast and yeast quickener composition may be used in the preparation of a variety of baked goods such as cakes, breads, puddings, potato products, cookies, and the like. The baked products obtained have greatly improved properties, such as more uniform structure, increased firmness and improved resistance to crumbling as well as better shelf life and resistance to freezing.

In order to more clearly delineate the amount of ingredients that can be utilized as a yeast extender-dough conditioner, the following table is included to show proportions of ingredients for the preferred compositions ranging from a broad range down to specific commercial preparations. It is to be remembered that this does not include the yeast which may also be added to prepare a so-called "super yeast".

PROPORTION OF INGREDIENTS FOR YEAST QUICKENER AND DOUGH CONDITIONER

| | Broad Range | Preferred Range | A | B | C | D | E |
|---|---|---|---|---|---|---|---|
| Fenugreek | 0.2–5.0 | 0.5–3.0 | 3.0 | 4.0 | 1.0 | 2.0 | 0.5 |
| Rosemary | 0.1–3.0 | 0.2–2.0 | 1.0 | 2.0 | 0.5 | 1.0 | 0.3 |
| Whey solids | 50–75 | 55–70 | 70.0 | 65.0 | 65.0 | 61.0 | 60.0 |
| Starch | 0–20 | 3–15 | — | 7.0 | 10.0 | 12.0 | 18.0 |
| Lecithin | 5–15 | 8–13 | 15.0 | 10.0 | 11.0 | 9.0 | 8.5 |
| Ascorbic Acid | 5–15 | 8–13 | 11.0 | 8.0 | 8.0 | 13.0 | 8.7 |
| Salt | 0–5 | 1.0–4.0 | — | 3.0 | 3.0 | 1.0 | 2.0 |
| Dried Honey | 0–2 | 0.1–1.0 | — | 1.0 | 0.75 | 0.5 | 2.0 |
| Corn oil | 0–1 | 0.1–0.8 | — | — | 0.75 | 0.5 | — |

In the examples which follow the dough conditioner-yeast quickener composition is mixed with the yeast in warm water 105°–130° F. and let stand until the product has approximately doubled in size. The conditioner can then be added to the mixture to be leavened at the appropriate time as will be described. These examples are illustrative of the invention only and are not intended to be limiting in any way.

EXAMPLE I

This example illustrates the improved results obtained by adding to fenugreek and rosemary a dough conditioner-yeast quickener composition.

A base composition was prepared by mixing the following ingredients in percent by weight:

| | | |
|---|---|---|
| Whey solids | 68.0% | by weight |
| Starch | 10.0% | by weight |
| Lecithin | 11.0% | by weight (Conditioner A) |
| Ascorbic Acid | 8.0% | by weight |
| Salt | 3.0% | by weight |
| | 100.0% | |

A second dough conditioner was prepared by mixing of fenugreek and 0.5% of rosemary to the above conditioner and reducing the whey solids. That composition contained the following ingredients.

| | | |
|---|---|---|
| Rosemary | 1.0% | |
| Fenugreek | 0.5% | |
| Whey Solids | 66.5% | |
| Starch | 10.0% | (Conditioner B) |
| Lecithin | 11.0% | |
| Ascorbic Acid | 8.0% | |
| Sea Salt | 3.0% | |
| | 100.0% | |

Each of the above dough conditioners (A&B) were used to prepare bread dough batches (A&B) using the following formula:

| | |
|---|---|
| 2¾ | Cups of water |
| 2 | tablespoons active dry yeast |
| 3 | tablespoons of the above-noted conditioner |
| ¼ | cup vegetable oil |
| ¼ | cup honey |
| 1 | scant tablespoon salt |
| 10 | cups freshly ground whole wheat flour |

Both batches were mixed identically, keeping all factors as similar as possible. Both batches were prepared using a Bosch bread mixer. The water in both cases was 125° F. The dough conditioners mixed as noted above were added to the water and then the yeast was added. This mixture was allowed to proof for five minutes before the other ingredients were added. Then the oil, honey, salt and flour were added and the dough kneaded by the mixer for ten minutes. The dough was then removed from the mixer and divided into five 380g. loaves. Each loaf was shaped and placed into an oiled 3¼×7½ inch bread pan. The five loaf pans were placed side by side in the center of the oven. The oven was set at 150° F. and the bread was allowed to raise for thirty minutes. The oven was then turned up to 375° F. and the bread was baked for 25 minutes. Measurements were taken of the height of the tallest loaf at its highest point.

The results are shown in the following table:

| TRIAL NO. | BATCH A | BATCH B | HEIGHT DIFFERENCE |
|---|---|---|---|
| 1 | 9.0 cm | 10.2 cm | +1.2 cm |
| 2 | 9.6 cm | 10.7 cm | +1.1 cm |
| 3 | 9.9 cm | 10.4 cm | +0.5 cm |
| Average | 9.5 cm | 10.4 cm | +.9 cm |

The batch prepared from the dough conditioner B containing fenugreek and rosemary was superior in each of the three trials. As all other factors remained constant, the height improvement in each instance was due to the addition of the fenugreek and rosemary.

In addition, there was a reduction in the raising or mellowing time for doughs made from Conditioner B as compared to doughs made from Conditioner A.

EXAMPLE II 1.0% by weight of fenugreek and 0.5% rosemary is added to yeast quickener-dough conditioner composition made up of 61.0% by weight of whey solids, 12.5% starch, 11.0% ascorbic acid, 11.0% lecithin, 2.5% salt and 0.5% dried honey. One tablespoon of this conditioner is mixed with two tablespoons of dried yeast in ¾ cup of water at a temperature of 120°–130° F. This mixture is set aside to let rise.

One and one-half cups of milk are scalded. Into a large mixing bowl is measured ¼ cup of sugar, 2 teaspoons salt, ¾ of a square of melted margarine and the scalded milk. A little flour is blended to make a smooth mixture and then 2 eggs, well beaten, are also added. The combination of the risen yeast with the dough conditioner, and 6–8 cups of additional flour are added gradually to the ingredients in the mixing bowl to form a dough mixture which is removed and kneaded. The dough mixture is then returned to the bowl and covered with a cloth and let rise.

Once the dough is risen, it can be punched down and let rise a second time. In either event, the dough is subsequently rolled out, put in a pan and let rise again after which it is baked at about 350° F. for about 25 minutes. The dough is firm and the baked product does not crumble and provides an increased volume over a comparable product wherein the dough conditioner is not used.

EXAMPLE III

Example II is repeated with the exception that the dough conditioner consisted of: 2.0% by weight of fenugreek, 0.7% rosemary, 64% whey solids, 10% lecithin, 11% ascorbic acid, 8.3% starch, 3.0% salt and 1.0% dried honey. The amount of added yeast is reduced to 1 tablespoon and the product obtained is comparable to that described in Example II.

EXAMPLE IV

Into a mixture containing 1 cup of warm water is dissolved one teaspoon of the dough Conditioner B of Example I and 2 tablespoons of yeast. This mixture is set aside to rise. Into a large mixing bowl is measured 3 cups of warm water, 1 tall can or 13 ounces of evaporated milk, ½ cup of sugar, 5 teaspoons of salt and ¼ cup of margarine. Enough flour is added to make a dough and the dough conditioner-yeast quickener mixture with the yeast which has risen is added and the additional flour is added a little at a time until 8 to 12 cups of flour has been utilized. The dough is kneaded until light and satiny, i.e., for about 7 to 10 minutes and let rise. The dough is punched and then let rise again for another period whereupon it is shaped into four loaves and let rise again. The risen dough is then baked in an oven at 350° to 375° F. for 35 to 45 minutes brushed with margarine and then let cool. Here again the baked product has improved properties as to resistance to crumbling and improved texture. In addition, the shelf life is superior to a baked product similarly made without the use of rosemary in the dough conditioner.

EXAMPLE V

A wheat bread is made by dissolving 2 teaspoons of dough Conditioner B as used in Example I with four tablespoons of yeast in warm water and setting it aside to let rise. Into a large bowl is placed four cups of heated water, ½ cup of honey, 1 tablespoon of salt, four tablespoons of vegetable oil which combination is well stirred until the water, honey, salt and oil are all dissolved or form a stable emulsion. The risen yeast mixture in the water is then added and the flour is added (the flour consisting of 8 cups of white flour and four cups of whole wheat) and kneaded for 10 minutes or until smooth and elastic. The homogeneous mixture is then placed in a warm place to rise and then the dough is punched down, shaped into four loaves and let rise again. The dough is baked at 400° F. for about 30 minutes. The bread has a superior texture and is sliced easily without crumbling.

We claim:

1. A dough conditioning-yeast quickening composition comprising, in percent by weight, about 0.2–5% fenugreek, 0.1–3% rosemary, 50–75% whey solids, 5–15% lecithin and 5–15% ascorbic acid.

2. A dough conditioning-yeast quickening composition according to claim 1 which additionally contains fillers and flavoring agents selected from the group consisting of starch, salt, dried honey and silica gel or a silicate salt.

3. A dough conditioning-yeast quickening composition according to claim 2 comprising 0.5–3% fenugreek, 0.2–2% rosemary, 55–70% whey solids, 8–13% lecithin and 8–13% ascorbic acid.

4. A dough conditioning-yeast quickening composition according to claim 3 wherein the whey solids are selected from the group consisting of dried whey, reduced lactose whey, reduced minerals whey and whey protein concentrate.

5. A dough conditioning-yeast quickening composition according to claim 4 containing one or more fillers and flavoring agents selected from the group consisting of 3–15% starch, 1–4% salt, 0.1–1% dried honey and 0.2–2% silica gel or a silicate salt.

6. A dry yeast and dough conditioning composition wherein the weight ratio of dough conditioner to dry yeast may vary from 1:5 to 2:1 and wherein the dough conditioner portion of the composition is a composition comprising, in percent by weight, about 0.2–5% fenugreek, 0.1–3% rosemary, 50–75% whey solids, 5–15% lecithin and 5–15% ascorbic acid.

7. A dry yeast and dough conditioning composition according to claim 6 wherein the dough conditioning portion of the composition additionally contains fillers and flavoring agents selected from the group consisting of starch, salt, dried honey and silica gel or a silicate salt.

8. A dry yeast and dough conditioning composition according to claim 7 wherein the dough conditioning portion of the composition comprises 0.5–3% fenugreek, 0.2–2% rosemary, 55–70% whey solids, 8–13% lecithin and 8–13% ascorbic acid.

9. A dry yeast and dough conditioning composition according to claim 8 wherein the dough conditioning portion of the composition contains whey solids which are selected from the group consisting of dried whey, reduced lactose whey, reduced minerals whey and whey protein concentrate.

10. A dry yeast and dough conditioning composition according to claim 9 wherein the dough conditioning portion of the composition contains one or more fillers and flavoring agents selected from the group consisting of 3–15% starch, 1–4% salt, 0.1–1% dried honey and 0.2–2% silica gel or a silicate salt.

11. A dry yeast and dough conditioning composition according to claim 10 wherein the weight ratio of dough conditioner to dry yeast is about 1:1.

* * * * *